Feb. 21, 1967  H. RITTNER  3,305,765
APPARATUS FOR REGULATING LOAD CONSUMPTION
Filed Dec. 19, 1963

United States Patent Office 3,305,765
Patented Feb. 21, 1967

3,305,765
APPARATUS FOR REGULATING LOAD CONSUMPTION
Helmut Rittner, Erlangen, Germany, assignor to Siemens-Schuckertwerke Aktiengesellschaft, Berlin-Siemensstadt, Germany, a corporation of Germany
Filed Dec. 19, 1963, Ser. No. 331,656
Claims priority, application Germany, Dec. 24, 1962, S 83,050
5 Claims. (Cl. 323—19)

My invention relates to an apparatus for regulating the current, the voltage, or both of an electrical load, particularly such loads as are energized by alternating power sources through a semiconductor valve.

An object of the invention is to provide a simple and reliable construction for devices of this type. Another object of this invention is to provide a reliable galvanic separation of the current or voltage to be measured and the control circuit proper, and preferably to match the impedances of the load voltage or current sensor to the control circuit proper.

Another object of the invention is to provide a simple means for regulating the electrical operating conditions of one load in dependence upon the operating conditions of a second load, while at the same time galvanically separating the inputs and outputs in the measuring value converter.

According to a feature of my invention, the control current circuit of a valve regulating the current or voltage within a load connects to a contactless electrical switch operating periodically in synchronism with the supply potential, which switch has a delay in each cycle depending upon the departure from a predetermined measuring value that has been determined in a measuring value converter whose output is in turn determined by a magnetic-field dependent resistor.

These and other features of the invention are pointed out in the claims forming a part of this specification. Other objects and advantages of the invention will become obvious from the following detailed description when read in light of the accompanying drawings, although it will be obvious to those skilled in the art that the invention may be otherwise embodied without departing from its spirit and scope. In the drawings:

Figure 1:
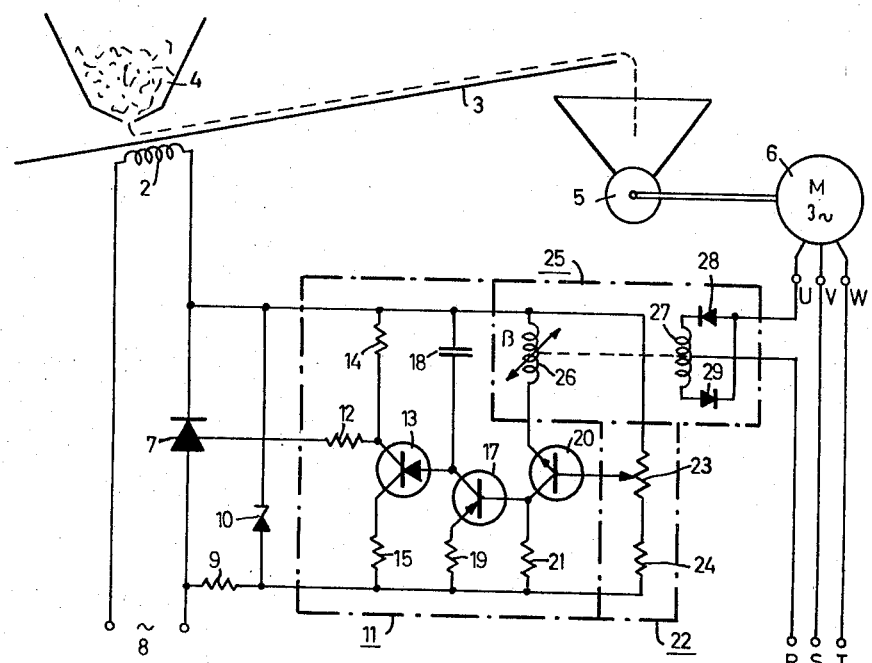
FIG. 1 illustrates a system embodying features of the invention wherein a regulating apparatus controls the drive of a conveyor apparatus in a mill in dependence upon the loading of the mill drive motor.

In FIG. 1 the current in a drive magnet 2 of a vibratory conveyor or shaker-trough 3 conveying mill products to a mill 5, is regulated in dependence upon the load on a mill drive motor 6. A three-phase network having phase leads R, S and T energizes the motor 6. A current regulating control valve 7, preferably a silicon controlled rectifier, connects a single-phase alternating-voltage source 8 to the vibratory magnet 2. The firing electrode of the valve 7 connects with a periodically switching electronic trigger circuit 11, whose switching times depend upon the extent to which the load on drive motor 6 departs from a predetermined reference value established in the circuit, and which serves for regulating the firing angle of the valve 7. A Zener diode 10 energized through a resistor 9 limits the energizing voltage of the trigger circuit 11.

The trigger circuit 11 includes a unijunction transistor 13 (a contactless switching element) having energizing resistors 14 and 15, a coupling resistor 12 for firing the valve 7, and a capacitor 18 for biasing its emitter. A p-n-p transistor 17 having an emitter resistor 19 charges the capacitor 18 in dependence upon output from n-p-n transistor 20 across collector resistor 21. The unijunction transistor 13 changes its switching condition or conductance condition and fires the valve 7 when the voltage at its emitter, which is determined by the voltage across the capacitor 18, exceeds a predetermined threshold value. The condition of the transistor 17 determines the charging time of the capacitor 18 which then establishes the firing angle of the valve 7. The base of transistor 17 connects to the collector of n-p-n transistor 20. A reference-establishing voltage divider 22 constituted by a potentiometer 23 series-connected with a resistor 24 sets the base current for the transistor 20. The emitter electrode of transistor 20 connects to a magnetic-field dependent semiconductor resistor 26, a so-called field plate, whose resistance varies with the strength of an impinging magnetic field.

Preferably the field-deepndent resistor is a galvanomagnetic resistor also called a "magnetoresistive" member. Such resistors or members are semiconductor devices in which by virtue of design and geometric features the occurrence of the Hall effect is suppressed or fully eliminated, with the result that the ohmic resistance of the device increases greatly in response to a magnetic field acting upon the device. Galvanomagnetic resistors are known from U.S. Patent 2,894,232, of H. Weiss and H. Welker, assigned to the assignee of the present invention. The preferred resistance materials for such resistors are indium arsenide and indium antimonide, especially the latter material which is used in the devices available from the assignee in the form of elongated prismatic bodies having terminals at their respective ends (field plates), as well as in the form of circular discs having one terminal in the center and the other terminal along the periphery (field discs), both types of galvanomagnetic resistors being more fully described in the above-mentioned patent.

In the present case the field plate 26 consists of a plate- or disc-shaped semiconductor body of indium antimonide or other $A^{III}B^{V}$ compound with a very high carrier mobility up to more than 60,000 cm.$^2$/v. sec. (preferably about 20,000 to 30,000 cm.$^2$/v. sec.). The field plate 26 constitutes a measuring value sensor in the output of a measuring value converter 25 which includes, as a measuring value transmitter, a measuring field coil 27 connected in the supply lead R of the motor 6. The supply lead R connects to a midtap of the measuring coil 27 which connects with the motor terminal U through two antiparallel-connected diodes 28 and 29.

Overloading of the drive motor 6 due to conveyance of an excessive amount of milling material to the mill 5 causes the current in motor 6, and hence field-coil 27, to rise. The rise in the magnetic field of the magnet 27 produces a resistance rise in the field plate 26 and thereby a proportional difference (drop) in the load current of the transistor 20 corresponding to the resistance change. This change in the load current of transistor 20 is amplified in the (now dropping) load current of transistor 17. Correspondingly, the charging current of capacitor 18 through transistor 17 decreases and its charge time lengthened. Thus the length of time during each cycle until the firing voltage of the switching element 13 is reached also increases, and thereby the firing angle for the current gate 7 is also increased. By firing angle is meant the angle or time delay until firing (conduction) takes place. The rise in the firing angle (drop in conduction angle) of the current gate 7 causes a decrease in the total energizing current of the vibratory magnet 2 and a corresponding diminution of the amount of the milling goods transported thereby. There follows easing of the load on the mill 5 and thereby a return of the primary current of motor 6 toward the value established by the reference device 22.

Field diminution of coil 27 with corresponding drop in motor current, for example due to unloading of the mill 5, and the drop in current of motor 6, produces a resistance diminution of field plate 26 and thus a rise in the load current of transistor 20. The thus raised current of transistor 17 shortens the charging time of capacitor 18. The firing angle of current gate 7 becomes smaller and the current in the vibratory magnet 2 correspondingly larger.

Figure 2:
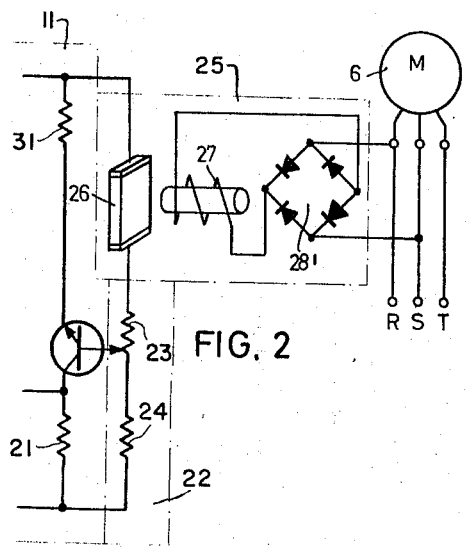
FIG. 2 is another embodiment of the regulating apparatus illustrated in FIG. 1.

In FIG. 2 the field plate 26 is in the control circuit of transistor 20. The emitter circuit of transistor 20 includes a resistor 31. The effect of resistance changes in field plate 26 upon the circuit 11 thus is opposite to that in FIG. 1. A rise in the magnetic field produces a decrease in the base current of transistor 20 and thus a decrease in the firing angle (increase in conduction angle) of the valve 7. As a corollary, a decrease in the magnetic field produces an increase in the firing angle.

In FIG. 2 the coil 27 does not possess a midtap and is connected across the output ends of a rectifier bridge 28' whose input terminals connect across the terminals R and S of the three-phase input circuit. Thus in FIG. 2 an overload of the motor 6 is measured by a decrease in voltage across terminals R and S resulting in a decrease resistance for the field plate 30 and an increased firing angle of valve 7 which slows down operation of the vibratory conveyor 3 so as to limit the load on the motor 6.

In the examples described herein, the use of the regulating apparatus according to the invention is applied to control a vibratory conveyor. However it will be obvious that the invention is applicable in other cases in which regulation of current or voltage is provided in dependence upon a variable value.

Figure 3:
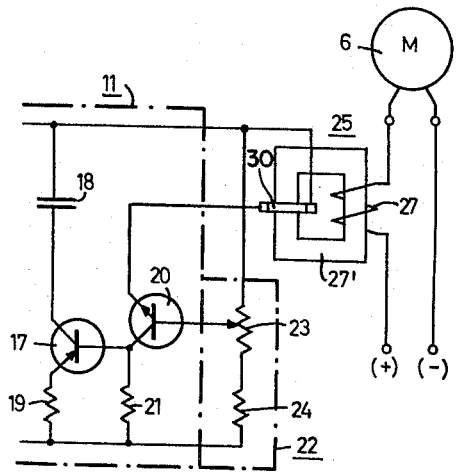
FIG. 3 is another embodiment of the circuit illustrated in FIG. 1.

Also in place of the illustrated three-phase motor 6 a direct-current motor can be used in which the measuring value transmitter 27 is arranged. This variation of FIG. 1 is shown in FIG. 3 wherein an electromagnetic core 27' is energized by coil 27. Furthermore instead of an electromagnet 27 regulation and control of an available value can be accomplished by means of a permanent magnet. The resistance of the field plate 30 can in this case be regulated by varying the distance of the plate from the poles of the magnet.

The galvanomagnetic resistor has the advantage of being a simple circuit element which may be manufactured with a basic (unmagnetized) impedance within a wide range. Thus the resistor can be inserted in place of most ordinary biasing resistors in a transistor or other circuit. The galvano-magnetic resistor may also be biased magnetically to a particular desired resistance value by a permanent magnet, a coil, or a special biasing current in coil 27. Since the resistance value of coil 27 may also be varied to the circumstances the coil-magnetogalvanic-resistor arrangement provides impedance matching between the motor circuit and the transistor input.

I claim:

1. An apparatus for regulating the consumption of an electric load energized from an alternating source, comprising controllable valve means intermediate said load and said source and having a control circuit, contactless electronic switch means for periodically operating in synchronism with said source and connected to said control circuit for controlling the valve operation, circuit means connected to said switch means for delaying the switching of said switch means in each period depending upon the departure from a predetermined value, electrical means connected to said circuit means for establishing said value, said circuit means including a magnetic-field dependent resistor, and magnetic means for making the resistor respond to a parameter of the load consumption.

2. An apparatus for regulating the consumption of an electric load energized from an alternating source, comprising controllable valve means intermediate said load and said source and having a conttrol circuit, electronic trigger means connected to said control circuit for initiating flow of current through said valve, capacitor means connected to said source so as to be periodically charged thereby for actuating said trigger means upon reaching a predetermined charge, and electrical means including a magnetic-field dependent resistor for establishing the charge rate of said capacitor and responding to an electrical parameter of said load consumption.

3. An apparatus for regulating the consumption of an electric load energized from an alternating source, comprising controllable valve means intermediate said load and said source and having a control circuit, electronic trigger means connected to said control circuit for initiating flow of current through said valve, capacitor means connected to said source so as to be periodically charged thereby for actuating said trigger means upon reaching a predetermined charge, a transistor having an emitter-collector path series connected between said capacitor means and said source to establish the current passing to said capacitor means, said transistor having a base, a second transistor having a conductance opposite to that of said first transistor and having a collector connected to said base and a control path, a magnetic-field dependent resistor in the control path of said transistor for establishing the charging rate of said capacitor means, and magnetic means for making the resistor respond to an electrical parameter of the load consumption.

4. An apparatus for regulating the consumption of an electric load energized from an alternating source, comprising controllable valve means intermediate said load and said source and having a control circuit, electronic trigger means connected to said control circuit for initiating flow of current through said valve, capacitor means connected to said source so as to be periodically charged thereby for actuating said trigger means upon reaching a predetermined charge, a transistor having an emitter-collector path series connected between said capacitor means and said source to establish the current passing to said capacitor means, said transistor having a base, a second transistor having a conductance opposite to that of said first transistor and having a collector connected to said base and a control path, a magnetic-field dependent resistor in the emitter of said second transistor and a voltage divider across said source having an adjustable midtap connected to the base of the second transistor, magnetic means for making said field-dependent resistor respond to an electrical parameter of load consumption.

5. An apparatus for regulating the consumption of an electric load energized from an alternating source comprising controllable valve means intermediate said load and said source and having a control circuit, contactless electronic switch means for periodically operating in synchronism with said source and connected to said control circuit for controlling the valve operation, circuit means connected to said switch means for delaying the switching of said switch means in each period depending upon the departure from a predetermined value, electrical means connected to said circuit means for establishing said value, said circuit means including a magnetic field dependent resistor responsive to a parameter of the load consumption, an electromagnet responding to the current of the load and having a gap, said magnetic-field dependent resistor being located in the gap.

References Cited by the Examiner
UNITED STATES PATENTS

| | | | |
|---|---|---|---|
| 1,810,539 | 6/1931 | Sokoloff | 338—32 X |
| 2,872,074 | 2/1959 | Birtwell et al. | 222—55 |
| 3,095,534 | 6/1963 | Cockrell | 321—19 |
| 3,139,216 | 6/1964 | Mell | 222—55 |
| 3,177,417 | 4/1965 | Wright | 318—331 |
| 3,215,928 | 11/1965 | Aiken | 323—94 |

JOHN F. COUCH, *Primary Examiner.*

W. E. RAY, *Assistant Examiner.*